United States Patent [19]

Chapman

[11] Patent Number: 4,480,506
[45] Date of Patent: Nov. 6, 1984

[54] APPARATUS FOR GENERATING LOBULAR POLYGONAL FORMS

[75] Inventor: Eugene K. Chapman, South Dartmouth, Mass.

[73] Assignee: Research Engineering & Manufacturing, New Bedford, Mass.

[21] Appl. No.: 311,504

[22] Filed: Oct. 15, 1981

Related U.S. Application Data

[63] Continuation-in-part of Ser. No. 122,412, Feb. 19, 1980, abandoned.

[51] Int. Cl.³ .................... B21K 5/20; F16H 37/14
[52] U.S. Cl. ........................... 76/4; 76/107 R; 74/52; 74/86; 219/69 V
[58] Field of Search ............... 51/90, 34 R, 281 R, 51/34 J, 281 P, DIG. 32, DIG. 14; 76/107 R, 4; 82/1.3; 219/69 V; 74/63, 86, 22 R, 52; 33/27 L

[56] References Cited

U.S. PATENT DOCUMENTS

| | | | |
|---|---|---|---|
| 743,293 | 11/1903 | Knight et al. | 82/1.3 |
| 1,482,110 | 1/1924 | Bolesky . | |
| 1,692,160 | 11/1928 | Dormer . | |
| 2,263,788 | 11/1941 | Schroder . | |
| 2,870,578 | 1/1959 | Baier | 51/90 |
| 2,909,010 | 10/1959 | Von Zelewsky | 51/90 |
| 3,195,156 | 7/1965 | Phipard, Jr. | 10/10 R |
| 3,491,604 | 1/1970 | Levi | 74/63 |
| 3,629,540 | 12/1971 | Altfeld | 219/69 V |
| 3,809,852 | 5/1974 | Weber | 219/69 V |
| 3,886,689 | 6/1975 | Yashino | 51/90 |
| 3,921,339 | 11/1975 | Kikuchi | 51/34 J |
| 4,137,797 | 2/1979 | Brems | 74/52 |

OTHER PUBLICATIONS

*American Machinist*, May 10, 1954, pp. 153-155, Contour Grinding by a Unique Mechanism.
*Fortuna*, Polygon Grinding Machines Model AFD . . . P.

Primary Examiner—Roscoe V. Parker
Attorney, Agent, or Firm—Trexler, Bushnell & Wolters, Ltd.

[57] ABSTRACT

Apparatus for generating a lobular polygonal form comprises a first device rotatable about an axis, a second device including a member eccentric to the axis and movable in an orbit thereabout, and a third device responsive to said combined movement of the first and second device for tracing a lobular polygonal form (1) which has an odd number of sides capable of maintaining approximate tangency with two parallel planes upon rotation of said form or (2) which has an even number of sides capable upon rotation of the form of maintaining approximate tangency with three circles of equal diameter and having equidistant centers. The generated lobular form may be traced by a metal-working tool that forms a die cavity in a workpiece. A novel lobular screw blank may be formed in the die cavity.

5 Claims, 16 Drawing Figures

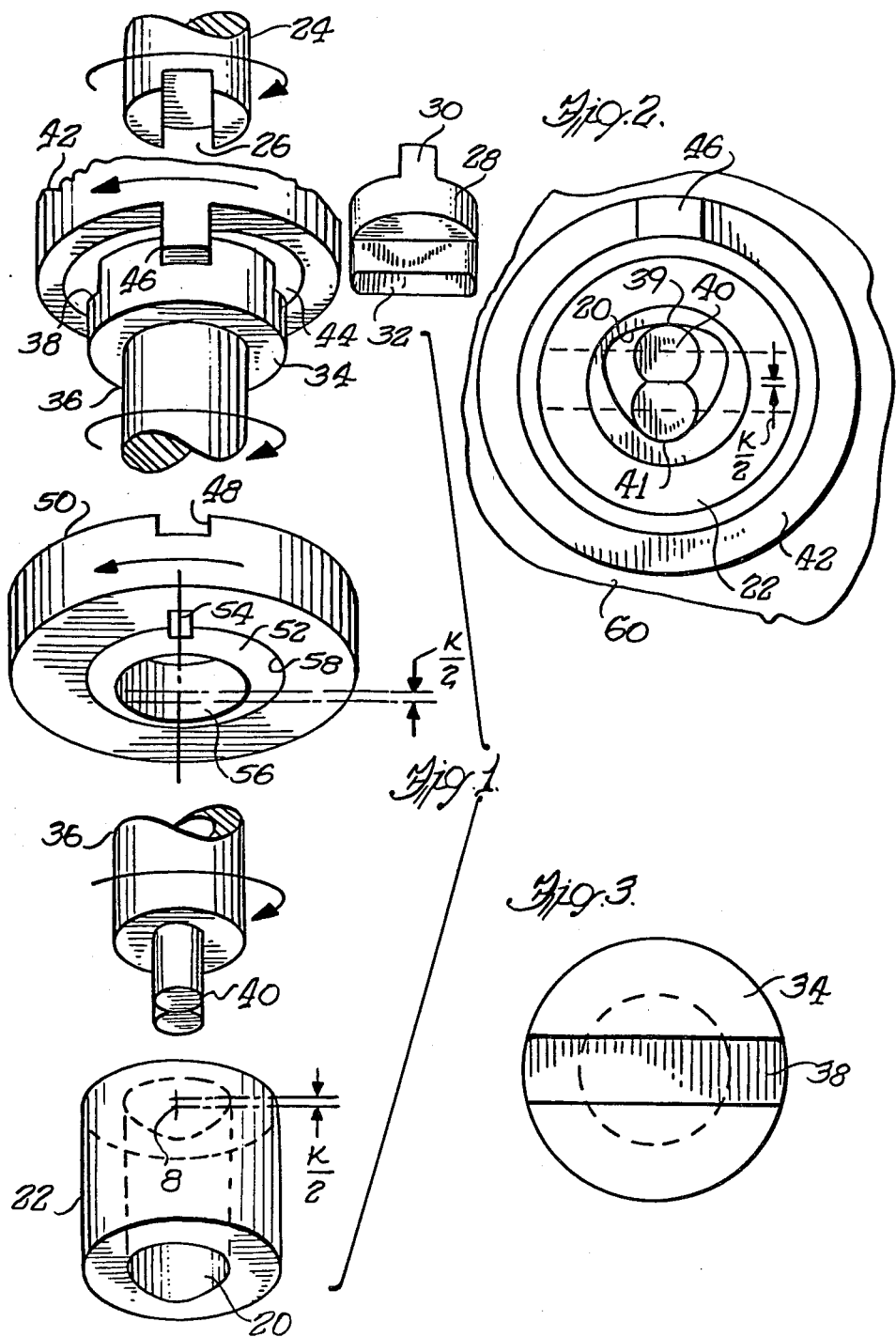

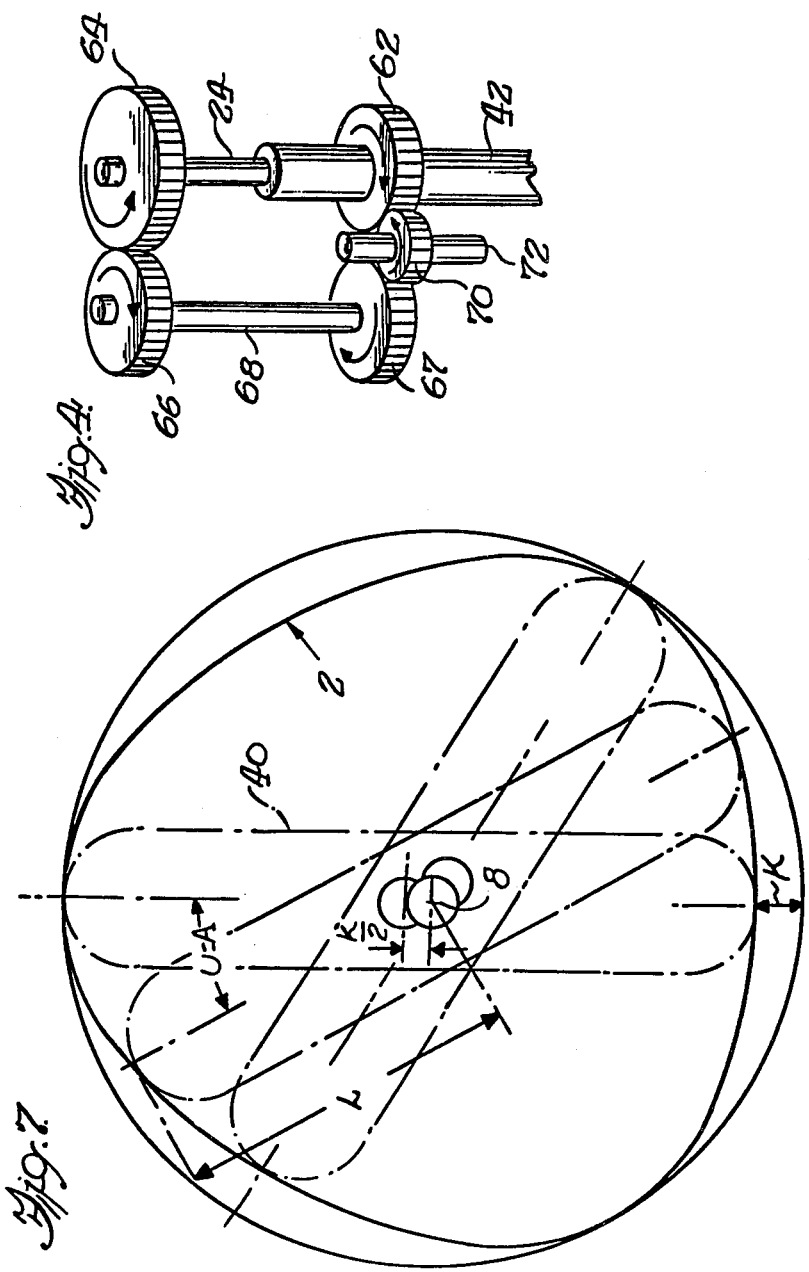

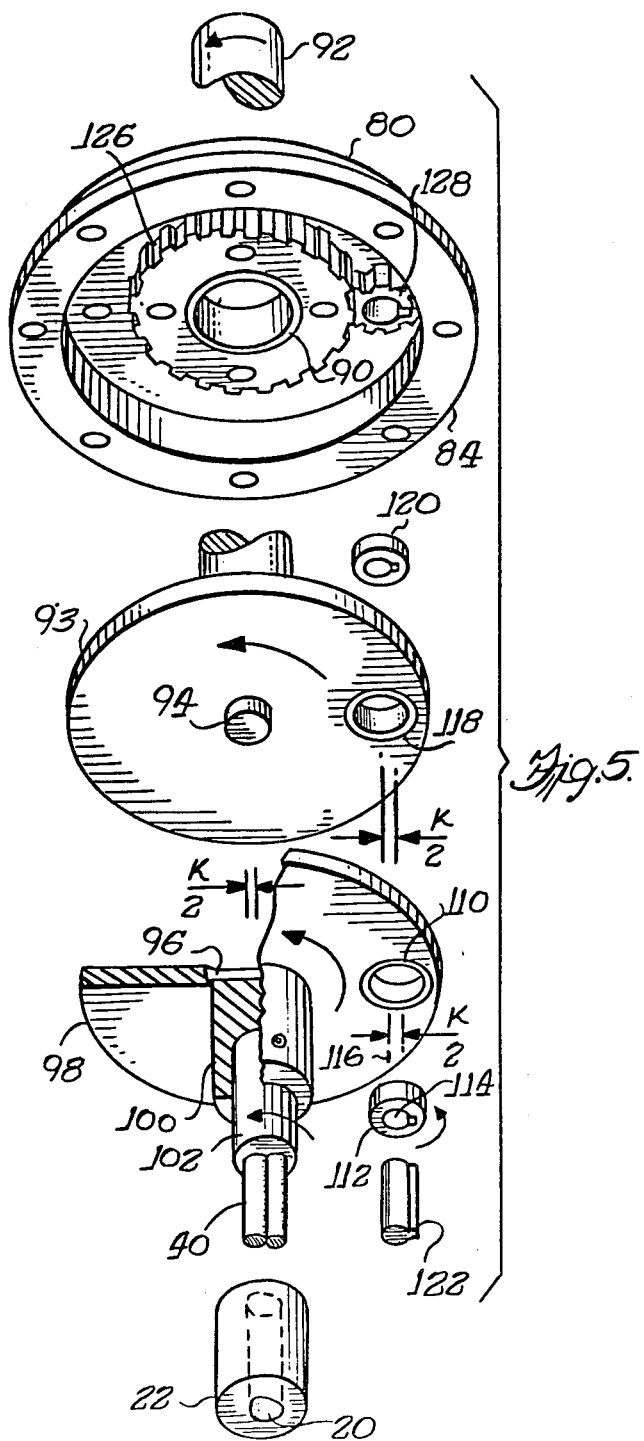

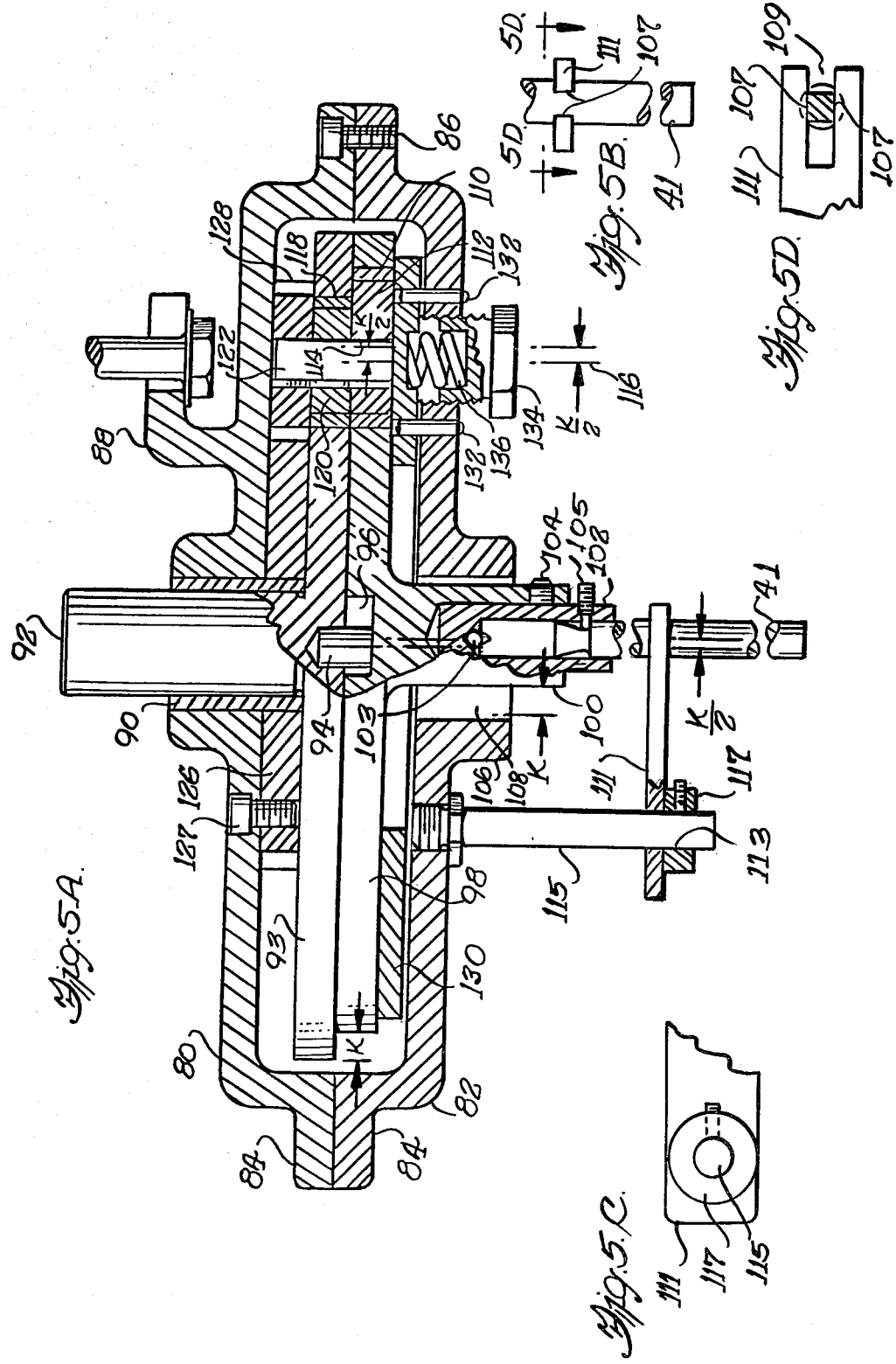

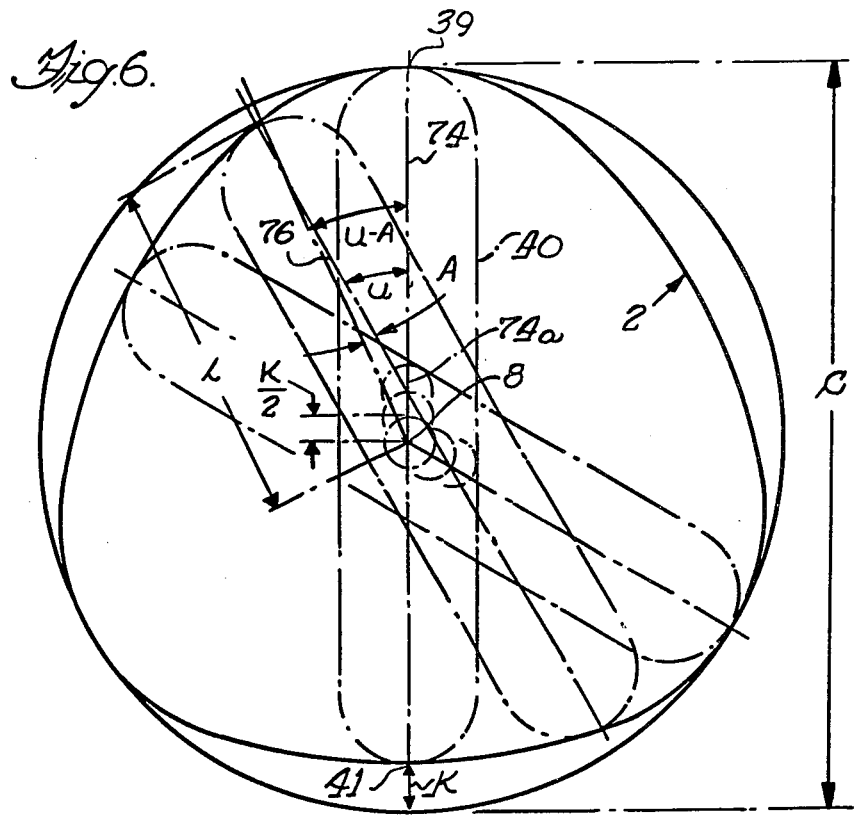
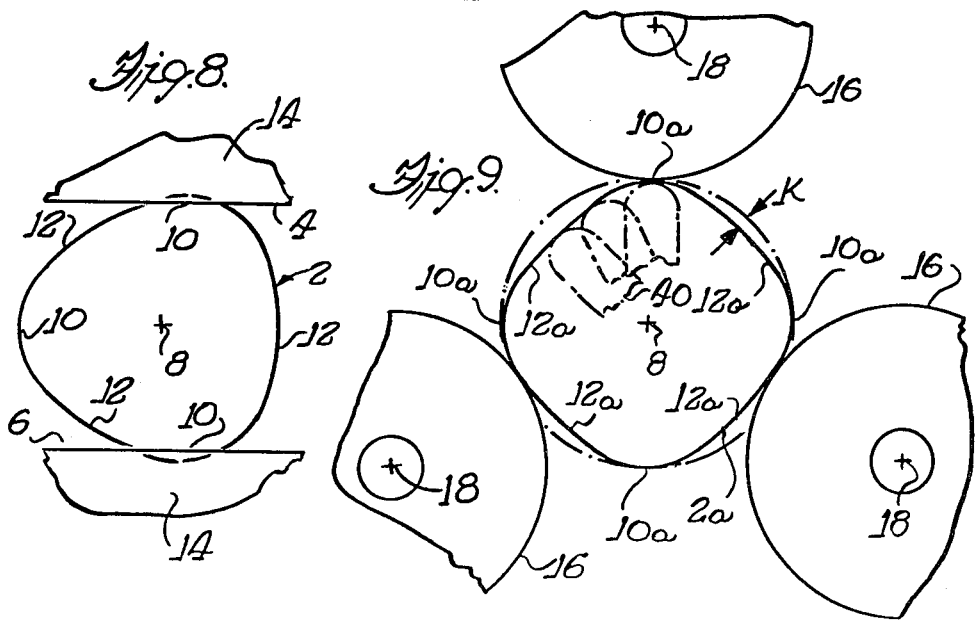

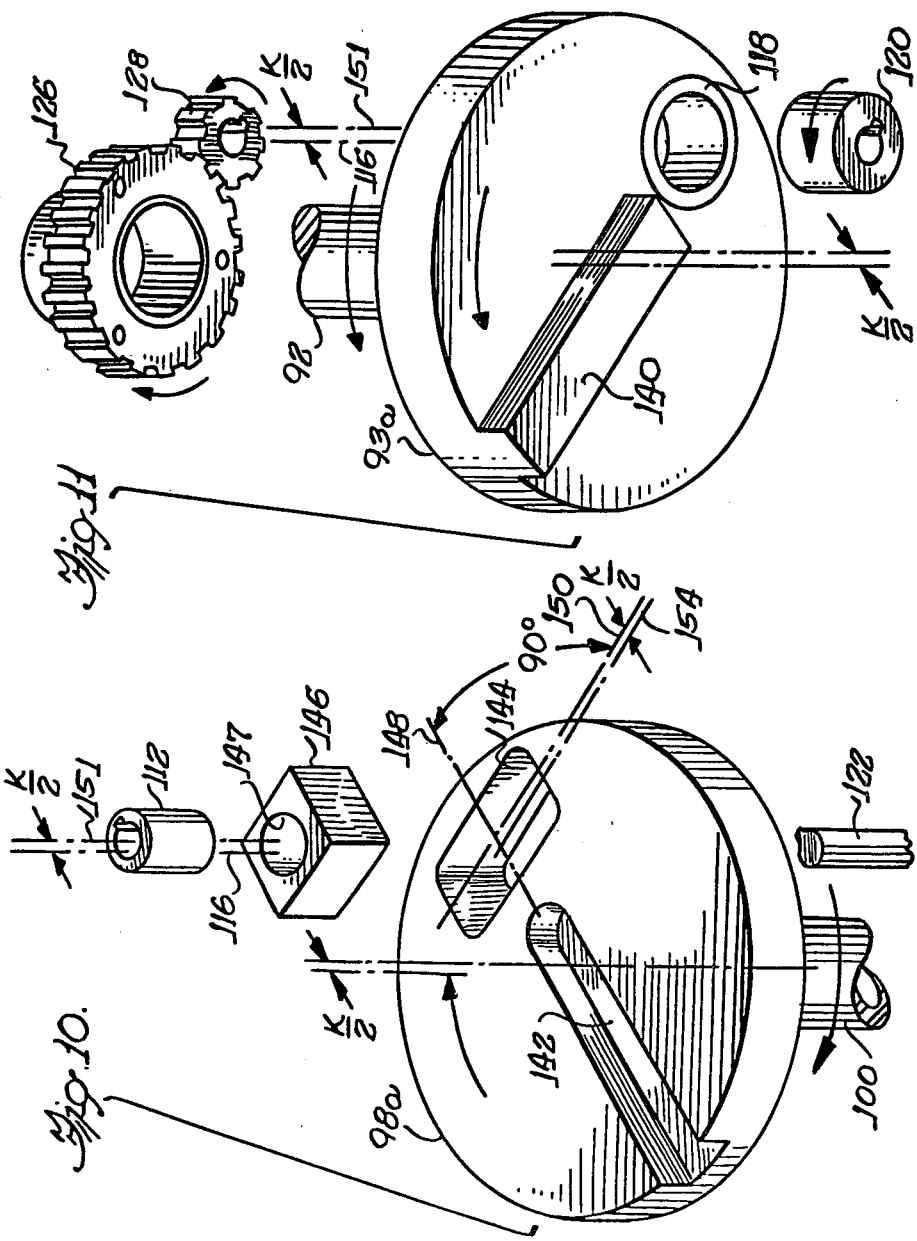

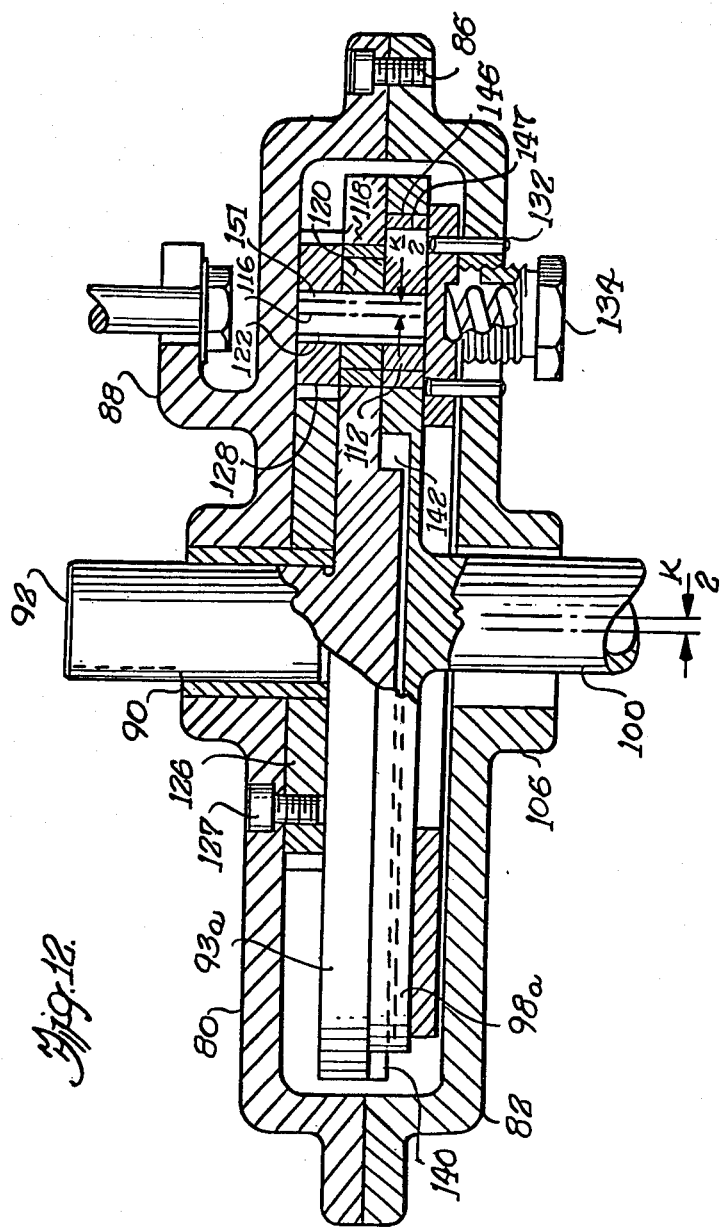

APPARATUS FOR GENERATING LOBULAR POLYGONAL FORMS

CROSS-REFERENCE TO RELATED CASE

This application is a continuation-in-part of my copending application Ser. No. 122,412, filed Feb. 19, 1980 and now abandoned.

BACKGROUND OF THE INVENTION

This invention relates to an apparatus and method for generating lobular polygonal forms for various purposes. The apparatus and method of this invention is particularly applicable to the machine tool art and is suitable for producing wire drawing and heading dies for use in the production of screw blanks for certain types of self-tapping screws.

One such well known type of self-tapping screw is shown and described in Phipard, Jr., U.S. Pat. No. 3,195,156. The screw of that patent is of the type having an arcuate polygonal cross sectional shape with an odd number of sides. In commercial practice this cross sectional configuration is characterized by three equally spaced lobes having a radius of curvature substantially less than one-half of the pitch diameter of the screw and with the lobes being separated by relatively broad arcuate sides each having a radius of curvature substantially greater than one-half the pitch diameter of the screw. The sides merge smoothly and continuously with the intervening lobes respectively. Self-tapping screws of this type are further characterized as having a substantially low driving torque and a relatively high stripping or failure torque. Such screws have enjoyed enormous commercial success throughout the world.

The aforesaid self-tapping screws are roll-threaded from a blank of preformed shape of lobular polygonal form, or alternatively having a tapered end of lobular polygonal form and a main body or holding section of circular cross section. In any event, wire shaping dies are used to reshape circular wire either throughout the length of the blank or at the tapered lead section into the trilobular form. Thus, a screw blank can be formed from stock by drawing a length of round wire through a forming or sizing die that has an arcuate polygonal, lobular, triangularly shaped orifice of a size and shape for producing the arcuate triangularly shaped lobular blank. Stock material so formed can then be fed into a conventional cold heading machine wherein predetermined length may be severed and the end portion of the length upset and headed by conventional upsetting and heading punches.

The manufacture of the wire drawing die and the heading die requires considerable time and skill in order to provide an accurate cross sectional shape. In this regard it should be noted that the lobular form is of a type that is of substantially uniform width throughout 360°. By that it is meant that when the polygonal form in the aforesaid U.S. Pat. No. 3,195,196 is revolved about its center, the polygonal form will be capable of maintaining tangency with two parallel planes. Therefore, the lobular form is capable of being rolled between two parallel roll-threading dies; however, the motion of the blanks is somewhat irregular and die wear may be a problem.

If the wire drawing dies are inaccurate as to shape, the result will be an error in the cross section of the blanks. In the heading dies, the lobular blank is received within the lobular die cavity for retention while the heading punches cold work the end of the blank to form the screw head. Desirably, the cavity of the heading die should conform closely to the configuration of the blank in order to prevent galling of the die upon removal of the headed blank from the die. Galling reduces die life.

The wire drawing and heading dies are sometimes made utilizing slightly different methods resulting in slightly different cross sectional shapes, thus contributing to the aforesaid problems. The production of tooling for these dies first requires careful grinding of the long arcs or major radii one at a time to form a hob or an electrode. The minor or small radii constituting the lobes are normally hand polished which often result in a lack of uniformity. These inaccuracies are passed on to the blanks and, in turn, to the threaded fasteners.

OBJECTS AND SUMMARY OF THE INVENTION

The object of this invention is to provide an apparatus and method for generating a similar, however, mathematically definable geometric lobular polygonal form for a variety of useful purposes including, but not necessarily limited to, the production of wire drawing dies and wire heading dies of the foregoing type.

Another object of the invention is to provide a method and apparatus for making a die that produces a novel screw blank that is lobular in shape but which roll-threads more nearly like a round blank than do other types of lobular blanks. Thus, the blank has a shape that is easy to roll, produces better thread quality, and increased die life. Thus, another object of the invention is to provide a new lobular screw blank.

A further object of this invention is to provide a method and apparatus of the types stated which reduces the production costs of the foregoing dies and provides, in the case of heading and threading dies, a die structure with improved life.

Broadly speaking the invention comprises apparatus for generating a lobular polygonal form comprising first means rotatable about an axis second means including a member eccentric to said axis and movable in an orbit thereabout, and third means responsive to the combined movement of the first and second means for tracing a lobular polygonal form (1) which has an odd number of sides capable of maintaining a close approximation to tangency with two parallel planes and, in the case of two flat and parallel roll threading dies, an exact tangency as the dies penetrate the form in the course of the threading operation upon rotation of said form or (2) which has an even number of sides capable upon rotation of said form for maintaining a close approximation to tangency with three circles of equal diameter and having equidistant centers, i.e. said centers defining the apexes of an equilateral triangle and in the case of three cylindrical roll threading dies so disposed, an exact tangency as the dies penetrate the form in the course of the threading operation. In the case of a polygonal form with an odd number of sides, the width is uniform throughout 360° as measured through the geometric center of the lobular form.

The invention provides mechanisms for generating the lobular polygonal forms or shapes, which may more properly be termed epitrochodial, utilizing various conventional metal removal techniques. These may be cutting, hobbing, abrading, or electrolytic removal of metal, sometimes known as electro-discharge machining (EDM). These lobular forms may be die cavities, external shapes, or the like. Such external shape may be a screw blank.

Lobular cylindrical screw blanks with an odd number of sides may be roll-threaded with conventional flat faced roll dies on high speed production threaders. On the other hand, even sided cylindrical shapes may also be threaded on another type of thread roller having three cylindrical dies the centers of rotation of which define the apexes of an equilateral triangle.

The lobular form that is generated and with which this invention is concerned has a center and, geometrically, may be inscribed in a circle whose diameter shall be referred to herein as the value C. The value K as used herein is the maximum amount that the sides of the broad or arcuate sides of the lobular polygonal form depart from the circumscribing circle. This value of K may also be known as the amount of out-of-round.

In one form of the invention the extremeties of a line (which can be the opposite ends of a tool) describe a true lobular form when moved triangularly under the influence of a rotating bushing having a bore eccentric by one-half of the required out-of-round (K). For a trilobular form of a uniform width throughout 360°, the relative rotation of the eccentric must be 3:1 with respect to the rotative movement of the line. If a four sided lobular form is to be produced, the relative rotation must be 4:1; for a five sided lobular form 5:1; for a polygon of N sides, the ratio N:1.

The apparatus just referred to may comprise a first drive shaft, a tool holder, a universal coupling joining said first drive shaft and said tool holder, a tubular drive shaft surrounding said first drive shaft, a member driven by said tubular drive shaft and having a bore eccentric to the axis of said tubular drive shaft for receiving said tool holder so that said tool holder rotates in said bore and also orbits about the axis of said tubular drive shaft, and means providing a relative speed of rotation between said tubular drive shaft and said drive shaft that is a whole integer.

In another form of the invention a planetary gear rotates in conjunction with a pilot pin which, in turn, is mounted and keyed to a bushing eccentric to the degree of out-of-round required. The pilot pin is rotatable relative to a drive plate that is integral with a drive shaft. The eccentric is rotatable in an output plate which is free to move laterally or oscillate, being guided by a central guide pin in an elongated slot in the output plate. The rotation of the drive plate turns the planetary gear and eccentric so as to induce reciprocating orbital motion to the output plate which carries the machining electrode or other tool.

Thus, the apparatus just referred to comprises a sun gear, an input shaft rotatable in said sun gear and having driving means thereon, an output member having a tool holder, a planetary gear orbital about said sun gear and in mesh therewith, an eccentric in said output member and movable therein, and means (e.g. a pilot pin) rotatable in said driving plate and keyed to said eccentric and said planetary gear; the gear ratio of said sun and planetary gear as being whole integer, whereby rotation of the input shaft rotates and orbits the planetary gear around the sun gear to drive said output member and said tool holder along a reciprocating and rotatable path that traces the polygonal form. In a one such arrangement the driving plate has a rectangular key that mates with a slot in the output member, the latter carrying a sliding block in which the eccentric is mounted.

In the method of making the wire shaping die there comprises the steps of rotating and oscillating a die cavity forming tool and a piece of stock relative to one another to trace a path on said stock that defines a lobular polygonal form with an odd number of sides and wherein the polygonal form is of substantially uniform width throughout 360°, and removing material from said stock along said path to provide a die cavity of said polygonal form.

In the method of making a wire drawing or heading die for a screw blank in accordance with the present invention and utilizing the embodiment thereof that forms a trilobular form, the radial distance from the midpoint of each arcuate side of the lobular form to the central axis is not substantially more than two-thirds and not substantially less than one-fourth of the depth of the thread to be formed on the screw when utilizing a screw blank having the trilobular form.

BRIEF DESCRIPTION OF THE FIGURES

FIG. 1 is an exploded perspective view of one form of apparatus in accordance with and using the method of the present invention;

FIG. 2 is a front elevational view of the apparatus of FIG. 1;

FIG. 3 is a fragmentary elevational view of the drive-coupling-engaging end of the electrode holder of FIG. 1;

FIG. 4 is a fragmentary perspective view showing the gearing arrangement for driving the structure of FIG. 1;

FIG. 5 is a fragmentary exploded perspective view showing a portion of a further form of an apparatus in accordance with and using the method of this invention;

FIG. 5A is a sectional assembly view of the apparatus of FIG. 5 but showing a modified form of electrode and holding arrangement therefor;

FIG. 5B is a fragmentary side elevation of the electrode and retaining dog shown in FIG. 5A;

FIG. 5C is a fragmentary front elevation of the electrode mounting arrangement of FIG. 5A;

FIG. 5D is a fragmentary section along line 5D—5D of FIG. 5B;

FIG. 6 is a geometrical diagram showing the trilobular form generated by the apparatus of FIG. 1;

FIG. 7 is a geometrical diagram showing the trilobular form generated by the apparatus of FIGS. 5 and 5A;

FIG. 8 is an illustration (exaggerated) of the trilobular form of screw blank being rolled between parallel screw dies;

FIG. 9 is a fragmentary diagramatic view illustrating a four sided lobular polygon and which, for example, may be a screw blank shown being rolled between three equidistant thread rolling dies of circular configuration;

FIGS. 10 and 11 are fragmentary exploded perspective views of a further form of the invention; and FIG. 12 is a sectional assembly view similar to FIG. 5 but of the form of the invention in FIGS. 10 and 11.

DETAILED DESCRIPTION

Referring more particularly first to FIG. 8 there is shown a lobular polygonal form 2 which has an odd number of sides capable of maintaining a close approximation to tangency thru geometric center with two parallel planes 4, 6 and in the case of two flat and parallel roll threading dies, an exact tangency thru geometric center as the dies penetrate the form in the course of the threading operation upon revolution of the form 2 about its center 8. The lobular form 2 is of trilobular configuration characterized by three equally spaced arcuate lobes 10, 10, 10 which are separated by three relatively broad arcuate sides 12, 12, 12. The form generated by this invention differs from that described in the Phipard Jr., U.S. Pat. No. 3,195,156 having an arcuate polygonal cross sectional shape consisting of two finite radii having centers fixed at the apexes of an arbitrary equilateral triangle and blended to describe the shape. By contrast the lobular polygonal form typical of the shape generated by this invention consists of a mathematically definable continuous cyclic curve of epitrochoidal form not capable of generation with two finite radii having centers fixed at the apexes of an arbitrary equilateral triangle. Thus, the polygonal form 2 is of such configuration that a straight line passing through the center 8 and intersecting opposite sides of the form will produce a line segment which is of substantially constant length regardless of the position of orientation of the line segment about the center 8.

The lobular form 2 may be a screw blank which is rolled between opposed thread rolling dies 14, 14 and with the parallel planes 4, 6 roughly corresponding to the thread-forming die ridges. In accordance with the present invention, apparatus and methods are provided for manufacturing a wire drawing die corresponding to the lobular form 2 and through which round wire may be drawn. Alternatively, the present invention provides for the production of a heading die having a cavity corresponding to the form 2 for receiving a similarly shaped screw blank.

Referring now to FIG. 9 there is shown a lobular polygonal form 2a which has an even number of sides, namely four sides 12a, 12a, 12a, 12a. The sides 12a are long arcuate sides which are separated by four intervening lobes 10a of much shorter radii of curvature. In any event, the radius of curvature of each side 12a and the radius of curvature of each lobe 10a is such that the lobular form 2a is capable of maintaining a close approximation to tangency with three circles 16, 16, 16 of equal diameter and which have equidistant centers 18, 18, 18. Thus, the centers 18, 18, 18 form the apexes of an equilateral triangle. FIG. 9 shows not only the lobular form 2a but the circumscribed circle so as to indicate the dimension K.

The lobular form 2a may be a screw blank and the circles 16, 16, 16 may represent rotating thread rolling dies. The present invention, therefore, also contemplates the manufacture of a wire drawing or wire heading die having a cross section the same as the lobular form 2a, i.e. with an even number of sides.

One form of apparatus or tool for generating the lobular polygonal form is shown in FIGS. 1–4. The working end of the tool that traces the lobular form traces the shape shown by the lobular polygon in FIG. 6. This lobular form, which is of lobular triangular configuration, is substantially of uniform width throughout 360°, departing therefrom by only minor errors which as a practical matter do not materially affect the uniformity of width, as aforesaid. The greater the ratio of C to K, the less will be the error. Thus, the apparatus of FIGS. 1–4 may produce a lobular polygonal triangulated die cavity 20 in a piece of stock material which ultimately may become a wire drawing die 22 or a heading die.

The apparatus comprises a central drive shaft 24 having a cross slot 26 at one end thereof. Disposed in the cross slot 26 is a universal coupling 28 having an upper rib 30 that slides in the cross slot 26 and a lower rib 32 that is disposed at right angles to the rib 30 and is on the face of the coupling 28 that is opposite to the face on which the rib 30 is located. Central drive shaft 24 is coupled through the coupling 28 to a collar 34 which is integral with or attached to a tool holder, such as an electrode holder 36. As best seen in FIG. 3, the upper face of the collar 34 has a transverse slot 38 which slidably receives the rib 32 of the coupling 28. The forward end of the holder 36 receives an electrode 40 for electro-discharge machining the cavity 20 in the die 22. Other types of tools may be substituted for the electrode 40, for example, various types of cutters. It is the electrode 40 or like tool that traces the lobular form, such tracing being carried out by opposed surface portions 39, 41 of the electrode 40 in a manner known in the art.

The apparatus also includes a sleeve-type drive shaft 42 having a large central bore 44 of a size to provide clearance for the collar 34 in its rotational and orbital movement relative to the coupling 28. The sleeve shaft 42 has a forwardly extending drive dog 46 which engages a cross slot 48 on the back side of an eccentric unit 50. The eccentric 50 has a central bore with a removable bushing 52 which is secured in place by a key 54. The bushing 52 has a central bore 56 for rotatably receiving the electrode holder 36. The center of the bore 56 is eccentric to the center of bore 58 in which it fits. Thus, the bushing 52 may be removed and replaced with a bushing having a bore 56 with a greater or lesser amount of eccentricity with respect to the center of the bore 58. The center of bore 58 coincides with the center of shaft 24. The amount of eccentricity of the bore 56 with respect to the bore 58 determines the amount of out-of-round or the value of K for the lobular form being generated. As shown in FIGS. 1 and 2, this eccentricity is a value of one-half K.

The eccentric unit 50 may be externally journalled for rotation in any suitable manner as in a tool housing 60. The shafts 24, 42 may likewise be conventionally journalled in the tool housing. The several parts of the tool rotate in the direction as indicated by the arrows in FIG. 1 so that the electrode 40 generates the lobular form in the stock material and thereby traces out the lobularly shaped die cavity 20.

The drive for the sleeve shaft 42 and the central drive shaft 24 may be through the gearing arrangement shown in FIG. 4. Gear 62 is fixed on the sleeve shaft 42 while the gear 64 is fixed on the central drive shaft 24. In the form of the invention illustrated, a trilobular polygonal form is generated; and the gear ratio between the sleeve shaft 42 and the central drive shaft 24 is 3:1. If a four-sided polygon were to be generated as in FIG. 9, this ratio would be 4:1. Thus, the number of sides of the polygon to be generated will depend upon the gear ratio. The gear ratio will be N:1 for an N sided polygon. For the trilobular form, the 3:1 gear ratio is effected by providing one counterclockwise rotation of the central drive shaft 24 for the two clockwise turns of the sleeve type drive shaft 42.

The gear 64 meshes with a gear 66 on a jack shaft 68 that may be powered in any conventional manner. The jack shaft also has a second gear 67 of the same diameter and number of teeth as the gear 66. Gear 67 meshes with idler gear 70 on idler shaft 72. Idler gear 70 meshes with gear 62.

By reason of the foregoing construction, the tool 40 will have a compound or composite movement which is both reciprocating and rotational. Thus, the tool 40 rotates about its own axis and also orbits about that axis. It will be appreciated that if the value K were equal to zero the tool 40 would simply have circular motion and would trace a circular form. However, as soon as a value of K is introduced by the use of an appropriate eccentric bushing 52, a lobular shape or out-of-round will be introduced into the form being generated.

FIG. 6 shows a geometric and generally diagramatic illustration of the tool as it generates the lobular form 2. In the graph of FIG. 6 L is the distance from the center 8 of the lobular form to the end of the electrode or other tool 40, (e.g. cutting, abrading, etc.). This end traces the polygonal form. U is the angle formed by the longitudinal center line 74 of the tool at its initial position and the center line 74a of the tool in a position of rotation and oscillation. The angle U minus A is the angle formed by the longitudinal center line 74 and the line 76 passing through the center 8. The angle A is the angle formed by the center line of the tool (e.g. 74a) at a given point and the line passing through the center 8. By way of example the value C equals 11.0 and the value of K is 0.75. Under those conditions the rotational and orbital movement of the tool will result in the tool going through a movement indicated in FIG. 6 which shows several positions of the tool. The resultant approximate values of the various foregoing parameters are indicated on the table below for angles of U from 0° to 70°:

| U° | A° | (U − A)° | L |
|----|------|----------|------|
| 0  | 0.00 | 0.00     | 5.50 |
| 5  | 1.01 | 3.99     | 5.49 |
| 10 | 1.97 | 8.03     | 5.45 |
| 15 | 2.82 | 12.18    | 5.40 |
| 20 | 3.50 | 16.50    | 5.32 |
| 25 | 3.97 | 21.03    | 5.23 |
| 30 | 4.18 | 25.82    | 5.14 |
| 35 | 4.12 | 30.88    | 5.04 |
| 40 | 3.76 | 36.24    | 4.99 |
| 45 | 3.12 | 41.88    | 4.87 |
| 50 | 2.24 | 47.76    | 4.80 |
| 55 | 1.17 | 53.83    | 4.76 |
| 60 | 0.00 | 60.00    | 4.75 |
| 65 | −1.17 | 66.17   | 4.76 |
| 70 | −2.24 | 72.24   | 4.80 |

The values of L and A repeat inversely every 60 degrees.

FIGS. 5 and 5A show another form of apparatus for generating the lobular polygonal form through the use of an electrode 40 or 41 (or other tool) that forms the die cavity 20. In the forms of the invention in FIGS. 5 and 5A there is also a member eccentric to an axis and movable in an orbit thereabout, the eccentric serving to drive the tool in an orbital and rotational path to trace the lobular form.

More particularly, the apparatus of FIGS. 5 and 5A comprises a housing with a top section 80 and lower section 82. The housing sections are generally cylindrical configuration and have peripheral flanges 84 at which the housing sections are secured together as by circumferentially spaced bolts 86. The housing section 80 integrally includes a bracket or anchor lug 88 and by which the entire housing may be mounted on a suitable support.

The top or upper housing section 80 has a central bore that contains a bearing 90 that journals an input drive shaft 92. This input drive shaft 92 is integral with a drive plate 93 positioned within the housing. The drive plate 93 has a central, coaxial guide pin 94 that fits within a transverse slot 96 on an adjacent output plate 98. The difference in diameters of the drive plate and the output plate is substantially the maximum out-of-round or K value of the polygon to be generated by the machine.

The output plate 98 has a forwardly projecting hub 100 that receives a collar or holder 102 that receives the electrode 40 or other metal-working tool. The holder 102 is retained within the hub 100 by any suitable means as by a set screw 104. The lower housing section 82 has an axial boss 106 with a central bore 108 that provides clearance for the holder 102, such clearance being the maximum value of K of the lobular form that will be generated or traced by the electrode 40. In the form of the invention of FIG. 5, the electrode 40 is a dual rod; however a modified form of electrode arrangement is shown in FIGS. 5A–5D.

The holder 102 of FIGS. 5A–5D may be of a bearing material such as a lubricated bronze. The inner end of the electrode 40 is recessed and has a ball bearing 103 for absorption of a minimal thrust. Intermediate its ends the holder is grooved for receiving a spring plunger 106 that retains the electrode 41 assembled with the holder 102 but allows relative rotation of the electrode 41 with respect to the holder 41.

Outwardly of the holder 102 the rod electrode 41 has opposed flats 107 (FIG. 5D) for slidably receiving the slotted end 109 of a dog 111. At its opposite end the dog 111 has a hole 113 for pivotally receiving the end of a post 115 fixed as by threading into the housing section 82. A collar 117 on the post 115 retains the dog assembled therewith. As will be explained more fully hereinafter, the output shaft or hub 100 rotates and reciprocates to generate the lobular form, for example that shown in FIG. 6. In doing so the electrode 41 does not itself rotate although it slides in slot 109. Nevertheless, the full 360° of available surface on the electrode is used to traverse the lobular form.

Radially outwardly of the center of the input shaft 92 the output plate 98 has a bearing 110 for receiving a removable and replaceable eccentric 112. The eccentric 112 has a bore 114 with a center line 116 that is eccentric to the bore of the bearing 110 by an amount equal to one-half K. The drive plate 93 is also bored for receiving a bearing 118 having a central bore that receives an insert 120. The insert 120 is annular and has a central bore which is coaxial with the bore 114 of the eccentric. A pilot pin 122 has a full length key which is keyed to the eccentric 112 and to the insert 120 whereby the eccentric 112 rotates in its bearing 110 while the insert 120 rotates in its bearing 118.

Secured to the inside face of the housing section 80 as by a series of bolts 127 is a sun gear 126 that is coaxial with the input shaft 92 and is in mesh with a pinion or planetary gear 128. This planetary gear 128 has a central bore which receives the pilot pin 122 and its key and is thus keyed thereto whereby the planetary gear 128 rotates with the eccentric 112.

Also within the housing and interposed between the output plate 98 and the inside wall of the housing section 82 is an annular thrust ring or pressure plate 130. The pressure plate is "floating" and has a tension adjustment mechanism at three equally spaced locations circumferentially about the central axis of the pressure plate 130. The tension adjustment mechanism comprises pins 132 which slide in the pressure plate 130 and which are fixed in holes in the housing section 82. A tension adjustment screw 134 is threaded into the housing section 82 in opposition to a compression spring 136. Thus, the screw 134 of each tension adjustment mechanism can be adjusted for the proper pressure of the plate 30 against the surface of the output plate 98.

The gear ratio between the sun gear 126 and the planetary gear 128 is a whole number integer, for instance 3:1. This gear ratio will produce a trace of the tool 40 as a three-sided or trilobular polygonal shape shown in FIG. 6, or as a die cavity 20 in the die 22 shown in FIG. 5. The gear ratio may be changed, for example, to a value of 4:1., 5:1, N:1, etc., in order to produce four or five sided or N sided polygons.

The input shaft 92 may be driven from a suitable motor or other source of power. As the input shaft 92 rotates, the driving plate 93 also rotates causing the planetary gear 128 to orbit about the axis of rotation of the input shaft 92. As the planetary gear rotates about the center line 116, the eccentric 112 will also rotate causing the output plate 98 to reciprocate an amount equal to the throw of the eccentric 112, which is an amount equal to one-half K on each side of the center line 116. Thus, the combined rotational and orbital movement of the output plate and tool 40 traces the lobular form. Furthermore, the eccentric 112 may be removed and replaced to provide bores 114 of different eccentricity so as to vary the value of K in the generated polygon.

FIG. 7 shows the trilobular curve or form 2 generated by the apparatus of FIGS. 5 and 5A. The curve 2 is based on formula:

$$L = \frac{K[1 + \cos N(U - A)]}{2} + \left(\frac{C}{2} - K\right)$$

where L is the radius from the center of the form, K is the amount of out-of-round, N is the number of lobes, C is the diameter of the circumscribing circle, and (U-A) is the angle of displacement of L from one lobe toward the next lobe. For a three lobe form the angle (U-A) is between 0° and 60°. Assuming a 3:1 gear ratio between the sun gear 126 and the planetary gear 128. Thus, the lobular shape can be determined by polar coordinates, namely the value of the angle (U minus A) and the length L. These figures are shown in the table below and they are based on a circumscribed circle diameter of C of 11.00 and K value of 0.75.

| (U − A)° | L |
|---|---|
| 0 | 5.50 |
| 5 | 5.487 |
| 10 | 5.450 |
| 15 | 5.390 |
| 20 | 5.313 |
| 25 | 5.222 |
| 30 | 5.125 |
| 35 | 5.028 |
| 40 | 4.938 |
| 45 | 4.860 |
| 50 | 4.800 |
| 55 | 4.763 |
| 60 | 4.750 |
| 65 | 4.763 |

The values of L decrease to 60° and then increase inversely back to 120°. Each 120° is a repetition of the previous 120°.

With respect to the four-sided polygon in FIG. 9, only one end of the tool 40 is used to generate the lobular form. In FIG. 9 the value of L will progressively decrease from the peak of each lobe through an angle of 45° and then increase again until the peak of the next lobe has been reached at 90°. However, the principles of generating the lobular form of FIG. 9 are the same as those previously described.

In order to generate a lobular form without a re-entrant curve, the value of K must necessarily be limited. Obviously if K is too great in proportion to the circumscribed circle diameter C the curve will be re-entrant and the resultant screw blank cannot be thread rolled. A re-entrant curve may, however, have certain advantages or other purposes such as, for example, forming a screw head for use with a companion shaped driver. It has been determined that in order to prevent a re-entrant curve being formed in a trilobular polygonal form the ratio of C to K should be equal to or greater than about 10.920. Ratios less than this value will define re-entrant curve. A nonre-entrant curve may be defined as one that has a shape such that all straight lines of tangency on the lobular form are outside of the form. The significant ratio for the four lobe shape is about 17.790; for the five lobe shape about 26.320.

A further modified form of the invention is shown in FIGS. 10–12. This form is similar to the form shown in FIGS. 5 and 5A, and like reference numerals indicate like parts in these two forms of the invention. However, in the form of the invention shown in FIGS. 10–12, the accuracy of the lobular form is quite great, being essentially error-free because it produces pure harmonic motion.

Basically the apparatus of FIGS. 10–12 utilizes a rectangular key in the driving plate which mates with a slot in the output plate to effect rotation while maintaining a fixed relationship between the output plate and a sliding block/eccentric combination also actuated by the driving plate in concert with the orbiting planetary gear. Thus, there is provided a drive plate 93a having a radially extending rectangular key 140. The key 140 slides in a radial slot 142 in the driven or output plate 98a. Both the key 140 and the slot 142 respectively extend to the peripheral portions of the plates 93, 93a.

Spaced from the slot 142 is a further slot 144 for receiving a sliding block 146 which reciprocates therein. The longitudinal center line 148 of the slot 142 is disposed at right angles to the longtudinal center line 150 of the slot 144. The eccentric 112 is journalled for rotation in the bore 147 of the sliding block 146, and the eccentric 112 is keyed to the pilot pin 122. As in the form of the invention shown in FIGS. 5 and 5A the pilot pin is also keyed to the insert 120 in the driving plate 93a. Likewise, the pilot pin 122 is keyed to the planetary gear 128. The line 150 is offset from the "line of centers" 154 of the pilot pin 122, planetary gear 128, etc., by an amount equal to one-half K. The pilot pin center line 116 is offset from the center line 151 of bore 147 by one-half K. Line 150 intersects line 151.

The lobular form generated by the mechanism of FIGS. 10–12 is similar to that as shown in FIG. 7 except with greater accuracy. The mechanism may be theoretically considered essentially as a four bar linkage where the link one-half K is the only finite quantity. The output plate may be considered a "connecting rod" of infinite length while one-half K (the throw of the eccentric) becomes a crank. The other link is the line of centers 154 and the other crank is an imaginary line parallel to the line of centers 154 and at an infinite distance therefrom. The mechanism might also be considered as embodying certain aspects of a so-called Scotch Yoke.

Various modifications of the apparatus and method may be made without departing from the invention. Thus, the lobular form that is traced may describe an external shape as well as a cavity or bore in a workpiece. For this purpose various conventional grinders and other metalworking machines may be appropriately modified with mechanism that results in the abrading element tracing the lobular form. Also, while even sided polygons may be generated by a tool having a single point of contact, as shown in FIG. 9, it is possible to employ a tool (electrode, hone, cutter, etc.) having three contact points spaced 120° apart for generating even sided polygons. Furthermore, the electrode holding arrangement for the round electrode 41 shown in FIGS. 5A-5D may be incorporated into the apparatus of FIGS. 10-12.

The invention is claimed as follows:

1. Apparatus for generating a lobular polygonal form comprising a first drive shaft, a tool holder, a universal coupling joining said first drive shaft and said tool holder, a tubular drive shaft surrounding said first drive shaft, a member driven by said tubular drive shaft and having a bore eccentric to the axis of said tubular drive shaft for receiving said tool holder so that said tool holder rotates in said bore and also orbits about the axis of said tubular drive shaft to trace said polygonal form, and means providing a relative speed of rotation between said tubular drive shaft and said first drive shaft that is a whole integer.

2. Apparatus according to claim 1 in which said member includes a removable member having said eccentric bore.

3. Apparatus for generating a lobular polygonal form comprising a sun gear, an input shaft rotatable in said sun gear and having driving means thereon, an output member having a tool holder, a planetary gear orbitable about said sun gear and in mesh therewith, an eccentric in said output member and movable therein, and means rotatable in said driving means and keyed to said eccentric and said planetary gear, the gear ratio of said sun and planetary gears being a whole integer, whereby rotation of the input shaft rotates and orbits the planetary gear around the sun gear to drive said output member and tool holder along a reciprocating and rotatable path that traces said polygonal form.

4. Apparatus according to claim 3 in which said eccentric is a removable member in said output member.

5. Apparatus according to claim 3 in which said eccentric is rotatable in a block, said block being slidable in said output member, said driving means and output member being keyed together for joint rotation and for relative sliding movement.

* * * * *